(No Model.)
W. P. GREEN.
Horse Detacher.
No. 236,803. Patented Jan. 18, 1881.
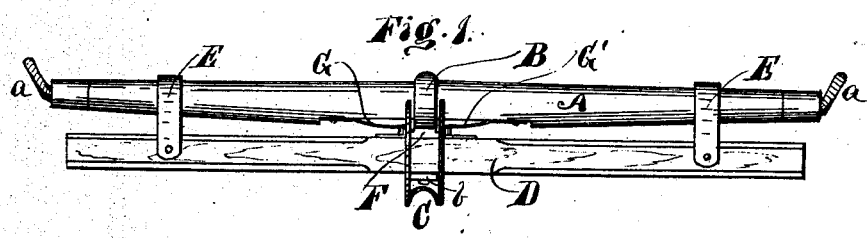
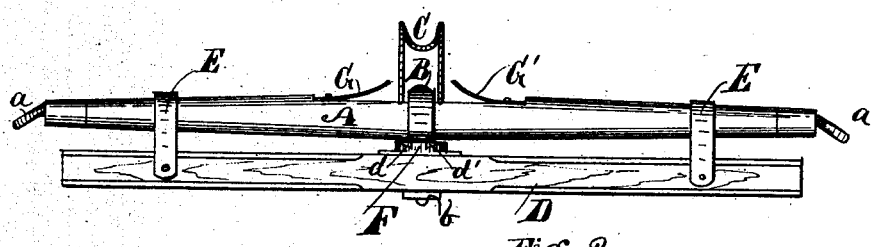
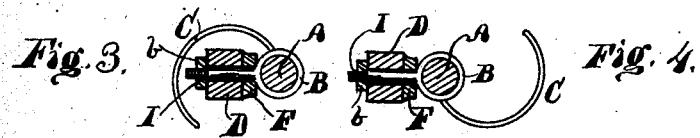
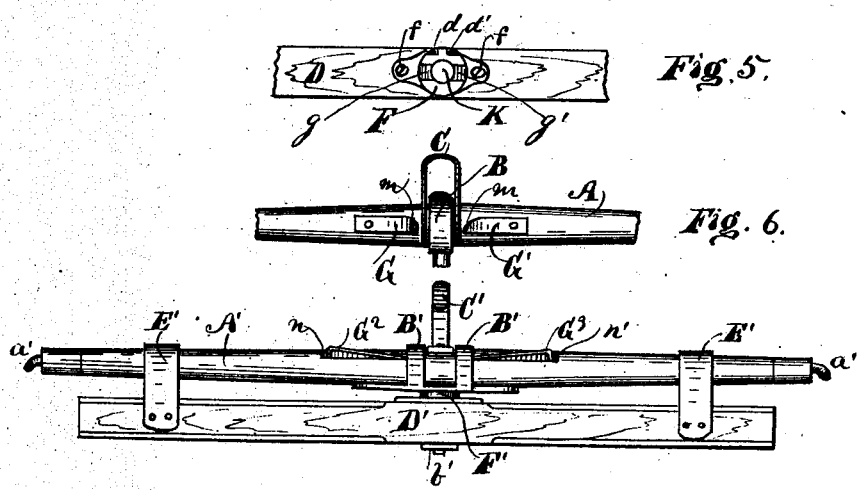
Witnesses:
James H. Roberts
Daniel F. Feezer
Inventor:
William P. Green

UNITED STATES PATENT OFFICE.

WILLIAM P. GREEN, OF RUSHVILLE, INDIANA.

HORSE-DETACHER.

SPECIFICATION forming part of Letters Patent No. 236,803, dated January 18, 1881.

Application filed May 24, 1880. (No model.)

*To all whom it may concern:*

Be it known that I, WILLIAM P. GREEN, of Rushville, Rush county, Indiana, have invented a new and useful Whiffletree, of which the following is a specification.

My invention relates to an improvement in safety-whiffletrees to be used on buggies, carriages, and other vehicles, the object of which is, first, to provide a device by the use of which frightened or runaway animals may be detached from the vehicle by the driver while sitting in the seat of the vehicle; second, to provide means by which the whiffletree may be attached to the cross-bar without boring a hole through it in the middle, which necessarily weakens it at the point where the strength is most needed and desired. I attain this object by the mechanism illustrated in the accompanying drawings, in which—

Figure 1 is a back view of a device embodying my invention. Fig. 2 is a back view of my device, showing the whiffletree turned half over to allow the tugs or traces to slip off of the curved pins at the ends of the whiffletree. Figs. 3 and 4 are detail views, showing the band-head bolt and a section of the whiffletree, and the cross-bar cut into at the point where the band-head bolt passes through the cross-bar, also showing sections of the lever by which the whiffletree is operated. Fig. 5 is a top view of a section of the cross-bar with a metal plate attached, on which the whiffletree rests. Fig. 6 is a sectional view with the whiffletree partially turned over, showing the springs that form the catches which prevent the whiffletree from turning over except when desired. Fig. 7 is a view of a modification of my device, showing a double band-head bolt and a single-arm lever.

Similar letters refer to similar parts throughout the several views.

The whiffletree A is made round and provided with curved metal pins $a\ a$ at the ends to receive the tugs or traces. It is made of suitable size at the middle to fit loosely in the band B. Said band is made fast to, or may be made a part of, the bolt I, Figs. 3 or 4. Said bolt passes down through the hole K, Fig. 5, and is held secure by the nut $b$ being screwed up on the bolt on the under side of the cross-bar D. The metal plate, Fig. 5, is made fast to the cross-bar D by screws or other means, and is provided with a hole, K, to receive the bolt I, and is also provided with projections $d$ on its upper surface and at the back side, $g$. These projections are sloped backward and downward to admit the springs G to be forced over them. Thus, when the lever C is pressed forward to its proper place, it causes the whiffletree to rotate, forcing the spring G over the projections $d$, and thereby locking it and preventing the whiffletree from accidentally rotating in the band B. The springs G serve to prevent any rattle or noise by bearing the whiffletree up against the inner surface of the band B; or, instead of the springs G G', rubber blocks may be attached to the whiffletree that fill the same office in operating my device. The lever is attached to the whiffletree on its under side, back of the cross-bar, and is curved so as to pass under and around it to the front. It is made double, or with two arms, which are attached to the whiffletree, one arm on one side of the band and the other on the other side, thus preventing the whiffletree from moving endwise in the band B. A strap or cord is made fast at one end to the lower end of the lever C, and the other end is passed back under the body of the vehicle to a point near the seat, where it is brought through a hole in the bottom of the body and made fast, to prevent its getting out of reach of the driver when in the seat.

The operation of my device is as follows: To the whiffletree A is attached the lever C. To the forward end of the lever is attached a strap or cord, which runs back under the body of the vehicle and is carried upward to a convenient place for a person in the seat to take hold of the cord, and by drawing it the outer end of the lever C is drawn backward, thereby causing the whiffletree to revolve in the band B, forcing the springs G backward over the projection $d$ on the metal plate F, thus turning the points of the metal pins $a$ forward, permitting the tugs or traces to drop loose, detaching them from the vehicle.

Having thus described my invention, what

I claim, and desire to secure by Letters Patent, is—

The combination, with the whiffletree A, provided with the lever-arm C and the sleeve B, having stem I, of the ratchet-plate F, furnished with teeth or catches $g\ g'$ and fixed to the cross-bar D, and the spring-pawls $G\ G'$, fixed to the whiffletree and arranged to engage the teeth or catches on the plate F, substantially as and for the purposes set forth.

WILLIAM P. GREEN.

Witnesses:
JAMES H. ROBERTS,
DANIEL F. FLEENER.